July 4, 1950 C. F. WILBERSCHIED 2,514,269
FLOWERPOT
Filed March 5, 1947
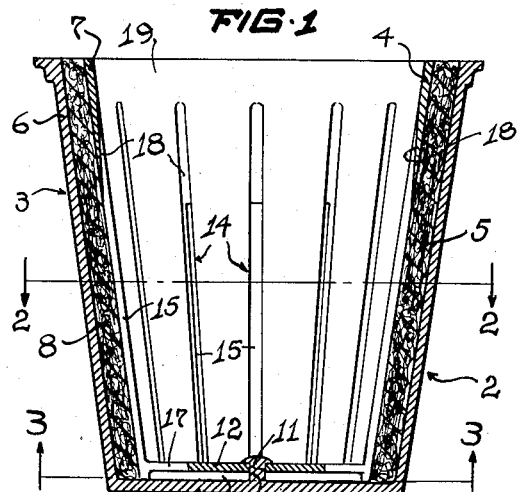
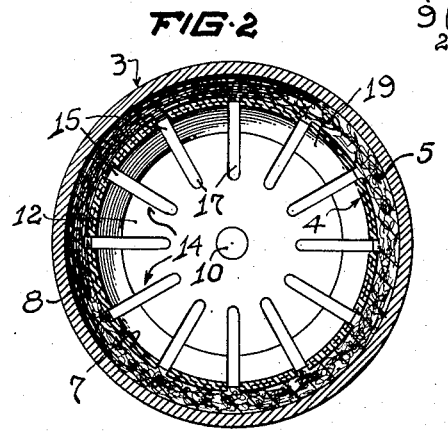
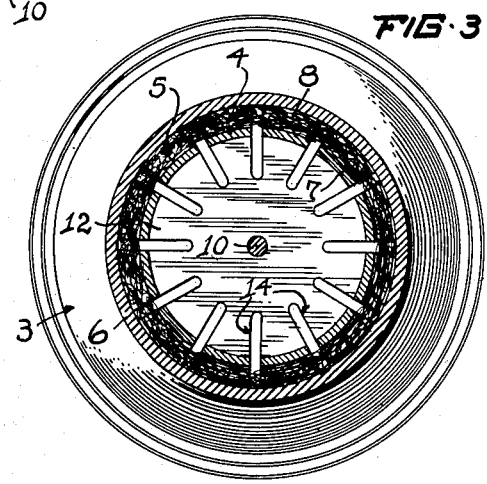
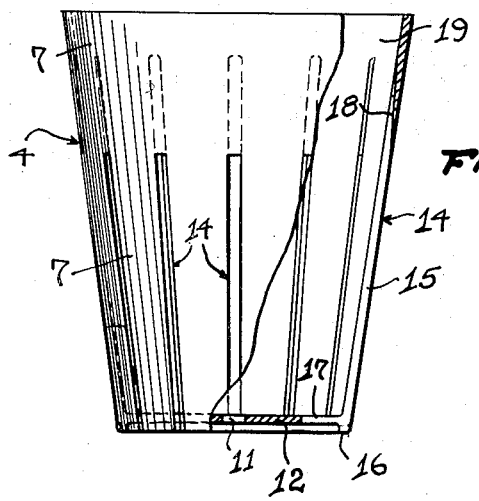
INVENTOR.
CHARLES F. WILBERSCHIED
BY
Gustav A. Wolff
ATT.

Patented July 4, 1950

2,514,269

UNITED STATES PATENT OFFICE 2,514,269

FLOWERPOT

Charles F. Wilberschied, Cleveland, Ohio, assignor to Vincent J. Sedlon, Bay Village, Ohio Application March 5, 1947, Serial No. 732,618

2 Claims. (Cl. 47—34)

This invention relates to flower pots or containers of the type in which an outer impervious vessel encircles in circumferentially spaced relation an inner earth and root holding vessel provided with a series of openings in its wall to permit open communication between the two vessels.

The primary object of the invention is an improved flower pot of the type referred to above, constructed for simple, quick and economic manufacture, improved serviceability and proper growth of plants.

Another object of the invention is an improved flower pot of the type referred to above, constructed for simple, quick and economic manufacture of its parts by casting operations and quick assembly to a permanent structure ready for serviceability and proper growth of plants.

In addition, the invention has other marked improvements and superiorities which radically distinguish it from presently known structures. These improvements or superior characteristics, embodying certain novel features of construction, are clearly set forth in the appended claims; and a preferred embodiment of the invention is hereinafter shown with reference to the accompanying drawing forming part of the specification.

In the drawing:

Fig. 1 is a vertical sectional view through a flower pot constructed in accordance with the invention.

Fig. 2 is a cross sectional view taken on line 2—2 of Fig. 1.

Fig. 3 is a cross sectional view taken on line 3—3 of Fig. 1; and

Fig. 4 is a side-view, partly in section, of the inner earth and root holding vessel.

Referring now more in detail to the exemplified form of the invention shown in the drawing, reference numeral 2 denotes a flower pot embodying an outer, cone-shaped vessel 3 and an inner, similarly cone-shaped, smaller vessel 4. Vessel 4 is arranged within vessel 3 in axial alignment therewith and rigidly secured to provide the flower pot with an annular space 5 between side wall 6 of vessel 3 and side wall 7 of vessel 4. This annular space is filled with a fibrous absorbent material 8 of sponge-like characteristics. The outer vessel 3 has integrally extended from the center of the inner face of its bottom wall 9 a finger portion 10 extended through a hole 11 in bottom wall 12 of vessel 4 and upset to rigidly secure the two vessels to each other.

The inner vessel includes in its circumferential side wall 7 a plurality of substantially L-shaped slots 14, the branch 15 of which extends downwardly from an area spaced from the top edge of said vessel to the bottom edge 16 thereof and the branch 17 of which extends horizontally and radially into elevated bottom wall 12 of said vessel. Slots 14 blend on slanting, downwardly converging lines 18 into the plane of the inner face 19 of side wall 7 to permit proper and simple casting of vessel 4.

Outer vessel 3, cast from metal or other suitable impervious material, acts as a decorative jardiniere and cooperates with inner vessel 4 in supporting the fibrous absorbent material adjacent to the vertical portions 15 of L-shaped slots 14. The fibrous material is arranged only in the ring-shaped space between the two vessels, whereas the space 20 between the bottom wall 9 of vessel 3 and bottom wall 12 of vessel 4 is free and provides storage space for excess water.

The slots in inner vessel 4 have a width of ⅛" to 1/16" to maintain the proper degree of moisture and provide sufficient aeration for the soil and roots in the vessel without danger of the soil mass becoming sour.

A flower pot of the construction described and shown in the drawing may readily and easily be manufactured at low cost by casting the two vessels and rigidly securing same together by upsetting finger portion 10 on outer vessel 3 extended through hole 11 in the bottom wall of inner vessel 4. In addition, flower pots of the type described permit a more complete control of plants by proper control of moisture and aeration over that possessed by flower pots now commonly used.

While there is shown and described only a single preferred embodiment of the invention, it will be understood that minor changes in construction, combination and arrangement of parts may be made without departing from the spirit and scope of the invention as claimed.

Having thus described the invention, what I claim is:

1. A flower pot comprising an outer, cone-shaped vessel of impervious material, an inner, similarly cone-shaped vessel arranged within said outer vessel in circumferentially spaced relation with respect to its inner wall, a plurality of L-shaped slots in the wall of said inner vessel having substantially vertical branches extended downwardly in the side wall of said inner vessel from an area spaced from the top edge of said vessel to the bottom edge thereof and horizontal branches extended radially in the bottom wall of said vessel, said vertical branches of said slots blending at their upper ends on downwardly converging lines into the inner face of the side wall of said inner vessel.

2. In a flower pot with axially aligned circumferentially spaced outer and inner vessels an inner vessel having L-shaped slots, each including a substantially vertical branch in the side wall and a horizontal branch in the bottom wall, the vertical branches of said slots being extended from an area spaced from the top edge of said inner vessel downwardly to the bottom thereof and the horizontal branches being radially extended into the bottom of said inner vessel, the said substantially vertical branches of said slots blending at their upper ends on downwardly converging lines into the inner face of the side wall of said inner vessel.

CHARLES F. WILBERSCHIED.

REFERENCES CITED

The following references are of record in the file of this patent:

UNITED STATES PATENTS

| Number | Name | Date |
|---|---|---|
| 153,715 | Landers | Aug. 4, 1874 |
| 805,491 | Sedlacek | Nov. 28, 1905 |
| 954,440 | Klemm | Apr. 12, 1910 |
| 1,928,810 | Burford | Oct. 3, 1933 |
| 2,057,972 | Pieck | Oct. 20, 1936 |